INVENTOR.
LOREN L. SCHUMACHER
BY Hamilton, Cook.
Renner & Kenner
ATTORNEYS

May 26, 1970  L. L. SCHUMACHER  3,513,713
POWER TRANSMISSION DEVICE
Filed Aug. 30, 1968  3 Sheets-Sheet 3

INVENTOR.
LOREN L. SCHUMACHER
BY Hamilton, Cook,
Renner & Kenner
ATTORNEYS

United States Patent Office 3,513,713
Patented May 26, 1970

3,513,713
POWER TRANSMISSION DEVICE
Loren L. Schumacher, 3140 Reimer Road,
Barberton, Ohio 44203
Filed Aug. 30, 1968, Ser. No. 756,550
Int. Cl. F16h 21/14
U.S. Cl. 74—55
8 Claims

ABSTRACT OF THE DISCLOSURE

A power transmission device for either a two or four cycle piston engine. The pistons linearly drive a slotted arm which has cam followers thereon. The cam followers ride in a cam plate along a path defined by cam surfaces and cam rollers. A drive shaft is transversely connected to the cam plate so that the linear motion of the slotted arm is imparted as rotary motion to the drive shaft.

BACKGROUND OF THE INVENTION

This invention relates to either an internal combustion or other powered two or four cycle engine power transmission device which is constructed so as to permit smooth and efficient conversion of linear piston motion to the rotary motion of a drive shaft.

Many engine power transmission devices are known to the prior art. In the past, most generally a crankshaft has been used to create the desired rotatary motion from the linear motion of pistons. But crankshafts have been found deficient for certain operations in that they allow only one engine cycle per revolution. Also, in order to get maximum leverage, the stroke must be increased to a sometimes inordinate amount. Further, the use of crankshafts involves the necessity for many other working parts such as cam shafts in four cycle engines, crossheads, etc., all of which require added maintenance and often contribute to shorter engine life.

There have been attempts at minimizing the number of working parts and increasing the cycles per revolution by replacing the crankshaft mechanisms with various shapes of lobed cams or cam groove surfaces. Nevertheless, these systems are fraught with inherent problems also. For example, in the devices employing a cam shaped like a triangle with rounded corners and indented or depressed sides, it was found that the cam had a short useful life and that the engine did not run smoothly. The reason for the short life of the cam was that it was forced to absorb the blow of the piston at the same position during each cycle. Thus the cam wore in some places quite readily while remaining "like new" on other surfaces. The unsmooth cam surfaces then compounded the rough running of the engine which was brought on initially by the fact that the cam followers were caused to first ride down the depressed side of the cam and then back up and over the lobed peak, thus creating uneven piston travel at both ends of the stroke. Many such engines found the piston traveling ⅔ of its linear stroke for a 30° rotation of the shaft; for smooth running, the piston of these devices should only have traveled ½ of its linear stroke for 30° rotation. Such uneven motion caused vibration which reduced efficiency, and caused unnecessary wear on the moving parts.

Further, the shapes of the cams necessarily employed decreased the efficiency of the engines in other respects. The depressed sides of the somewhat triangular cams employed cut down on the effective length of the lever arm of force being applied by the cylinders. Merely enlarging the lever arm would make the size of the engine housing quite impractical.

It has also been found that due to the positioning of the cylinders with respect to the cams, complex crosshead devices or linkage devices were necessary to assure straight line motion of the piston rods to alleviate wear on the pistons.

SUMMARY OF THE INVENTION

It is therefore a primary object of the present invention to provide a continuously smooth working cam-type power transmission device.

It is another object of the present invention to provide a device, as above, with less wear on parts and more efficient running.

It is still another object of the present invention to provide a device, as above, which eliminates the need for crosshead devices and cuts down friction between the working parts.

It is yet another object of the present invention to provide a device, as above, which can be readily adapted for use in both two cycle and four cycle piston engines, powered by gasoline, steam or the like.

These and other objects which will become apparent from the following specification are accomplished by means hereinafter described and claimed.

In general, the engine power transmission device constructed according to the concept of the present invention translates the linear motion of a plurality of piston members to rotary motion of a drive shaft. A cam plate having a cam surface and cam rollers thereon is connected to the drive shaft. Between each pair of pistons is a slotted arm, which arm carries cam followers which ride along the cam surface and at the same time contact the cam rollers at various points to rotate the cam plate and thus the drive shaft. The drive shaft rests within the slot of the arm so that it will not impede the linear motion of the arm, and so that the arm will not impair the rotary motion of the drive shaft.

A preferred embodiment of the present invention is shown by way of example in the accompanying drawings and hereinafter described in detail without attempting to show all of the various forms and modifications in which the invention might be embodied; the invention being measured by the appended claims and not the details of the specification.

DESCRIPTION OF THE PREFERRED EMBODIMENT

Figure 1:
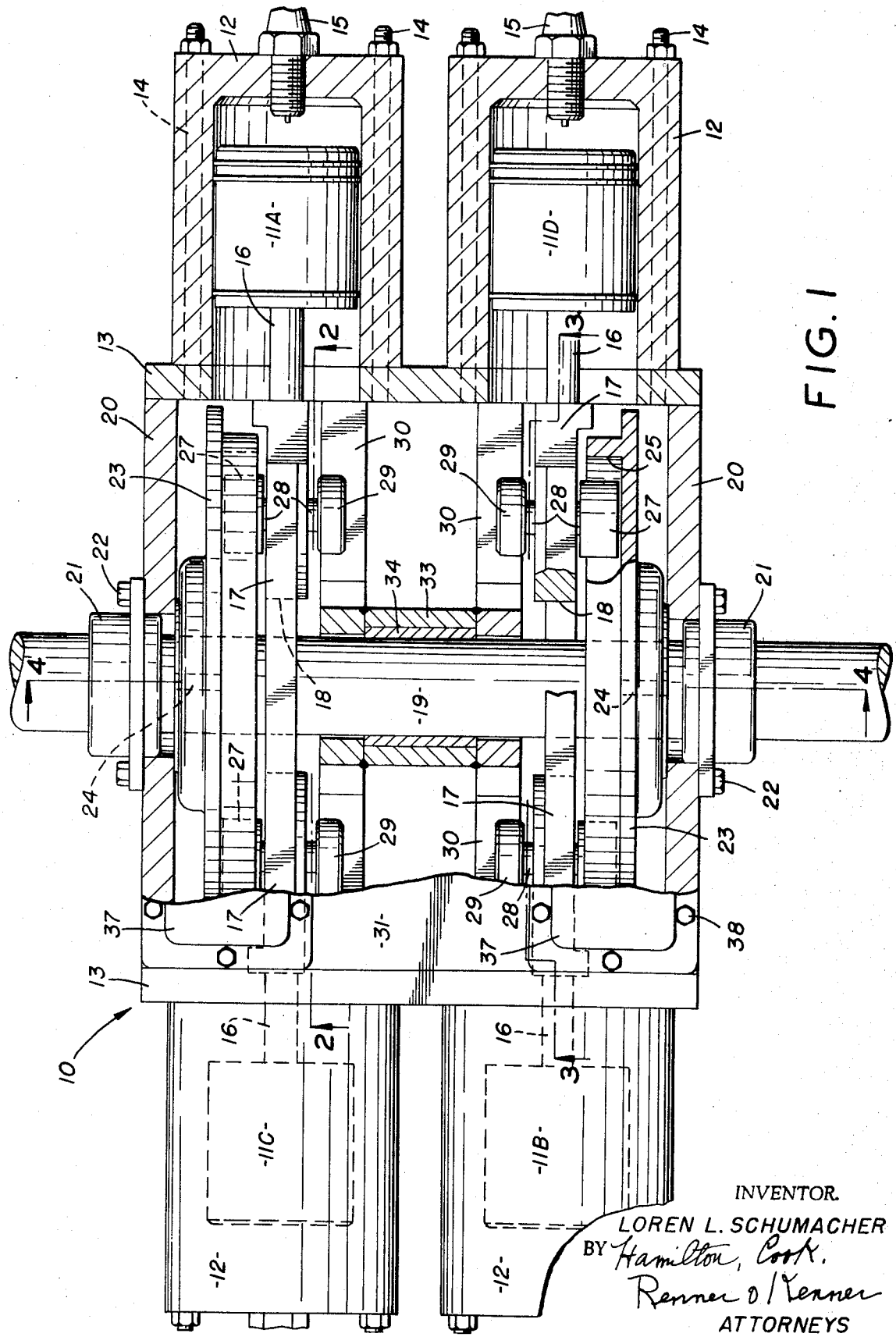
FIG. 1 is a partially sectioned, partially broken away plan view of a preferred embodiment of the invention.

The engine power transmission device of the present invention is indicated generally by numeral 10 in FIG. 1, and is shown as an internal combustion type. Four standard engine pistons 11 (A, B, C, and D) are shown working in a cylinder head or casing 12, it being understood that any even number of cylinders would be sufficient. As will more fully be discussed, it follows that the engine may be adapted to either two or four cycle processes. Each cylinder head 12 is fastened to side plates 13 of the engine by studs 14. Standard spark plugs 15 are shown in each cylinder 12. A piston rod 16 is rigidly mounted to each piston 11.

Figure 2:
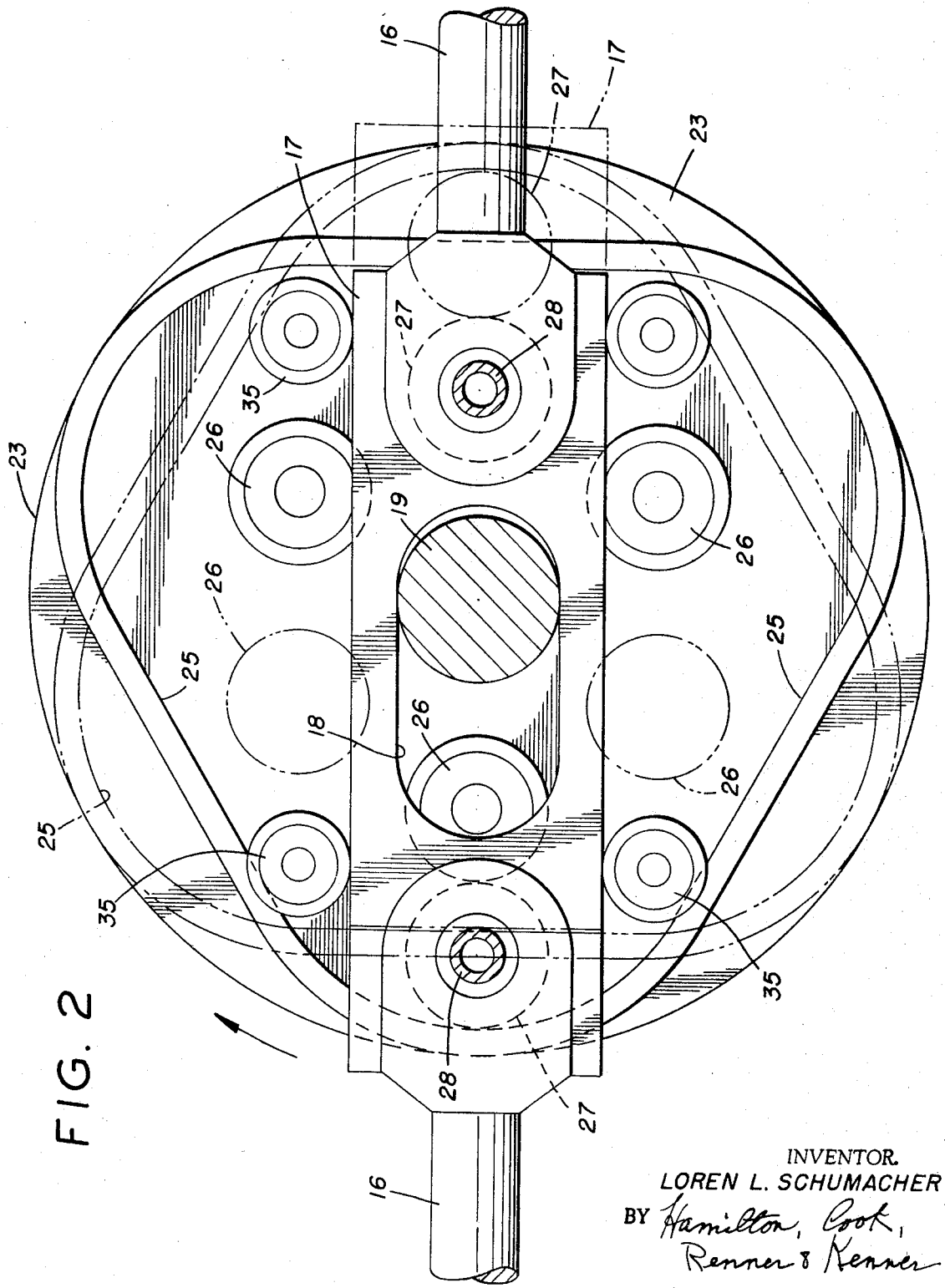
FIG. 2 is an enlarged sectional view taken substantially along line 2—2 of FIG. 1.
Figure 3:
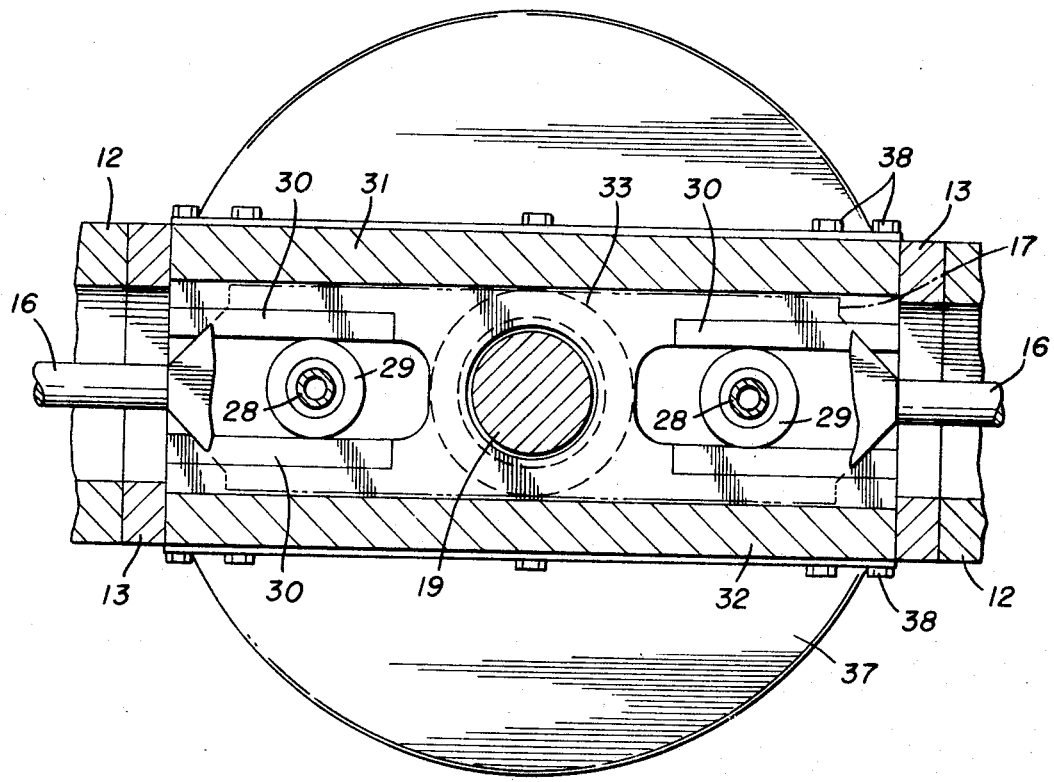
FIG. 3 is a sectional view taken substantially along line 3—3 of FIG. 1.
Figure 4:
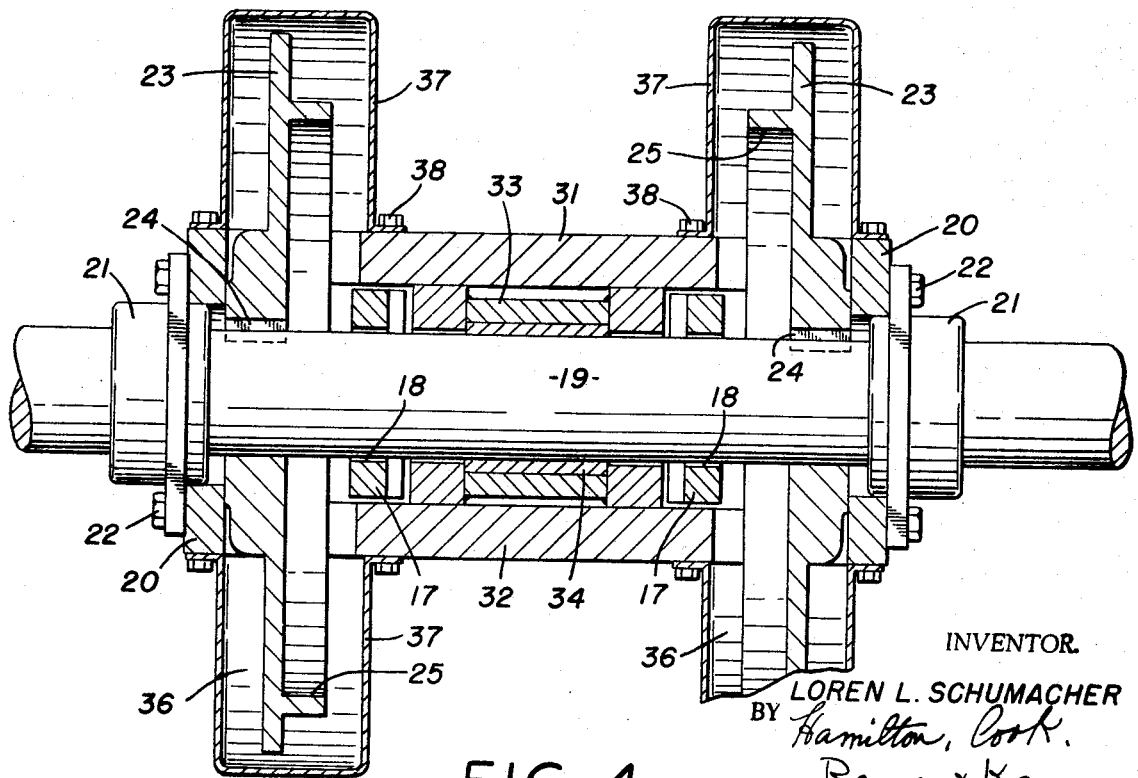
FIG. 4 is a sectional view taken substantially along line 4—4 of FIG. 1.

Each pair of opposed pistons, as for example 11A and 11C, has a slotted arm 17 attached between their respective piston rods 16. As best seen in FIG. 2, the slot 18 is somewhat oblong and is adapted to allow drive shaft 19 to pass therethrough, drive shaft 19 being transverse to arm 17.

Drive shaft 19 passes through end plates 20 and is provided therein with suitable flanged bearings 21 which are secured to end plates 20 as by bolts 22.

Cam plates 23 are fastened to the drive shaft 19 by keys 24. As best seen in FIG. 2, each cam plate 23 has a cam surface 25 cut therein, said surface being shaped somewhat like a triangle but having its corners rounded off. Further, each cam plate 23 has three rotatably mounted rollers 26 fastened thereon at an angle of 120° from each other (using the center of the cam plate as the axis). These rollers 26 are oriented on the cam plate 23 so as to correspond to the rounded off corners of cam surface 25, and leave a space therebetween just large enough for the presence of cam followers 27.

Cam followers 27 are rotatably mounted on shafts 28 extending from the slotted arms 17. Followers 27 are thus able to ride along the cam surface as arms 17 are actuated by pistons 11. To aid in the proper movement of arms 17, there are two guide rollers or bearings 29 furnished for each arm 17, said rollers 29 being rotatably mounted on shafts 28 and riding on hardened raceways 30 provided on top plate 31 and bottom plate 32.

Welded between the raceways 30 parallel to shaft 19 is an annular spacer 33 which helps to stabilize the device maintaining raceways 30 at a constant distance apart. Between spacer 33 and shaft 19 is a self-lubricating bearing 34. In order to further stabilize the system and maintain linear motion of both the arm 17 and pistons 11, four roller bearings 35 (FIG. 2) are mounted to the top plate 31 and bottom plate 32 (four each, respectively, for each slotted arm) and are adapted to ride against the outer surfaces of arm 17 and thus counteract any possible force tending to rotate said arm.

To maintain the device at the desired lubrication level of the working parts, each cam plate 23 is housed in an oil sump 36 which is defined by covers 37 mounted on top plate 31 and bottom plate 32 by bolts 38.

Having now described the device in detail, its operation should be evident. Referring to FIGS. 1 and 2, if the engine disclosed herein is to be of the two cycle type, it is clear that only two cylinders would be necessary; or if four are used, it is evident that the timing would be such that cylinders 11A and B would fire concurrently as would 11C and D. If the engine disclosed herein is to be of the four cycle type, then a firing order of 11A, B, C, D would be contemplated.

In either situation, FIG. 2 depicts the working of only one cam. As shown, the cam is in position ready for the firing of the cylinder on the left (with reference to FIG. 1, this would be cylinder 11C). One cam followers 27 is positioned between cam surface 25 and a cam roller 26. The other cam follower 27 on arm 17 is in contact with neither surface thus providing no resistance to the force of the pistons. Upon the firing of piston 11C, the cam follower 27 that is resting against the cam surface and roller will attempt to move downward along the cam surface in a counterclockwise direction, which in actuality forces the cam plate and the drive shaft to move in a clockwise direction as shown by the arrow in FIG. 2. This rotary force on the cam would tend to rotate the slotted arm 17; however, as previously discussed, roller bearings 35 counteract such a force and thus keep the movement of slotted arm 17 linear.

On full completion of the stroke, the cam plate 23 has now rotated to the chain line position of FIG. 2, the arm 17 now being in the far right position, having moved on bearings 29 along raceway 30. A subsequent firing of the far right piston (11A) then continues the motion of the cam plate and drive shaft. The adaptation of this device to multiple cam plates and multiple pairs of pistons should now be clear.

It should be noted that the device disclosed herein affords a minimum of frictional resistance since the prime moving forces are exerted by rotatable surfaces contacting rotatable surfaces (followers 27 on rollers 26); since one follower is always free of any surface contact during the firing of the piston on the opposite side; and since the cam surface 25 is designed having a minimum of "hills."

It should also be pointed out that due to the "roller to roller" contact of followers 27 and rollers 26 during the firing stage, the point of contact between the adjacent round surfaces will differ each successive time thus reducing the wear of parts that was so prevalent in the prior art that disclosed firing at the same point each time.

Thus, a power transmission device made under the above specification will carry out the aforementioned objectives thus substantially improving the internal combustion engine art.

What is claimed is:

1. A power transmission device comprising at least two piston means, at least one slotted arm means, piston rods connecting each end of a said slotted arm means to a said piston means, at least one cam plate having a cam surface and cam rollers, at least two cam following means positioned on said slotted arm means so that one of said cam following means is out of contact with said cam surface and said cam rollers at the time of firing of one of said piston means, a drive shaft passing through the slot in said slotted arm means, said cam plate being connected to said drive shaft so that linear motion imparted to said slotted arm means by said piston means is translated into rotary motion of said drive shaft by the interaction of said cam following means and said cam plate.

2. Apparatus according to claim 1, said cam surface being triangular in shape with rounded corners.

3. Apparatus according to claim 2, said cam plate having three of said cam rollers, one said cam roller being located in proximity to each rounded corner of said cam surface.

4. Apparatus according to claim 1, having a lubricating sump means for said cam plate.

5. Apparatus according to claim 1, wherein one of said cam following means is positioned between and in contact with said cam surface and one said cam roller when a said piston means is about to fire.

6. A power transmission device comprising an outer casing having top, bottom and side plates, at least two piston means, at least one slotted arm means, piston rods connecting each end of a said slotted arm means to a said piston means, at least one cam plate having a cam surface and cam rollers, cam following means on said slotted arm means, a drive shaft passing through the slot in said slotted arm means, said cam plate being connected to said drive shaft so that linear motion imparted to said slotted arm means by said piston means is translated into rotary motion of said drive shaft by the interaction of said cam following means and said cam plate.

7. Apparatus according to claim 6, said slotted arm means having a plurality of roller means which ride on said top plate and said bottom plate during the linear movement of said slotted arm means.

8. Apparatus according to claim 6, said top plate and said bottom plate having roller bearing guide means adjacent to said slotted arm means to maintain the linear motion of said slotted arm means.

References Cited

UNITED STATES PATENTS

| | | | |
|---|---|---|---|
| 315,270 | 4/1885 | Fowler | 74—567 |
| 780,130 | 1/1905 | Salzer et al. | 74—55 |
| 1,810,688 | 6/1931 | Toce et al. | 74—55 |
| 2,960,952 | 11/1960 | Krauss | 74—55 |

WESLEY S. RATLIFF, JR., Primary Examiner